United States Patent

Harakas et al.

[11] 4,052,524
[45] Oct. 4, 1977

[54] METHOD FOR IMPROVING ADHESIVE BONDING IN STEEL/RUBBER COMPOSITES AND ARTICLE

[75] Inventors: Nicholas K. Harakas; Kent H. Fulton; Paul A. Tierney, all of Raleigh; Malcolm F. Bender, Durham, all of N.C.

[73] Assignee: Monsanto Company, St. Louis, Mo.

[21] Appl. No.: 605,086

[22] Filed: Aug. 15, 1975

[51] Int. Cl.$^2$ .................. B32B 15/02; B32B 15/08
[52] U.S. Cl. ............................... 428/383; 427/327; 427/387; 427/388 B; 427/409; 428/295; 428/391; 428/447; 428/450; 156/110 A; 156/329; 152/359
[58] Field of Search ............... 428/391, 450, 382, 383, 428/295, 110, 112, 460; 156/110 R, 110 A, 110 C, 124, 329; 427/327, 409, 387, 388 B; 152/356, 359

[56] References Cited

U.S. PATENT DOCUMENTS

| | | | |
|---|---|---|---|
| 3,088,847 | 5/1963 | Pines ............................. | 428/450 X |
| 3,207,623 | 9/1965 | Marzocchi et al. ............. | 428/391 |
| 3,390,714 | 7/1968 | Marzocchi et al. ............. | 152/356 |
| 3,443,620 | 5/1969 | Vanderbilt et al. ............ | 156/110 R |
| 3,445,326 | 5/1969 | Hurst ............................. | 428/450 X |
| 3,542,639 | 11/1970 | Manino ......................... | 156/110 A |
| 3,689,300 | 9/1972 | Bunger et al. ................. | 428/391 X |
| 3,817,778 | 6/1974 | Wright .......................... | 156/110 A X |

*Primary Examiner*—Ralph S. Kendall
*Attorney, Agent, or Firm*—Russell E. Weinkauf

[57] ABSTRACT

A method is disclosed for improving the hydrolytic stability of the adhesive bond between an RFL type organic adhesive and a steel reinforcing element in steel-rubber composite articles. This is achieved by a pre-treatment of the steel surface before it is coated with the organic adhesive. The pre-treatment includes first immersing the steel element in an aqueous bath containing an acid, or base followed by a water rinse. A primer coating is then applied onto the surface of the steel element which consists of an organo-silane compound of the following formula:

$$X - R^1 - Si - (OR^2)_3$$

where X is an amino, glycidoxy or an aminoethyl radical; and wherein $R^1$ is an alkylene radical of from 2 to 4 carbon atoms when X is amino or glycidoxy and —HN—$R^3$—, where $R^3$ is an alkylene radical of from 2 to 3 carbon atoms when X is aminoethyl; and wherein $R^2$ is an alkyl of from 1 to 2 carbon atoms.

9 Claims, No Drawings

METHOD FOR IMPROVING ADHESIVE BONDING IN STEEL/RUBBER COMPOSITES AND ARTICLE

This invention pertains to the general field of steel-rubber composites in which an organic adhesive is interposed between the two materials to effect a metal-to-rubber bond. More particularly, the invention relates to a method for improving the hydrolytic stability of the bond between the steel reinforcing component of the composite and the metal-to-rubber organic adhesive.

BACKGROUND OF THE INVENTION

Composites of steel and rubber wherein reinforcing elements of steel or steel alloys are bonded to rubber find wide application in a variety of products which include, for example, conveyor belts, heavy duty hoses, pulley belts and pneumatic tires. The application of such composites in the fabrication of pneumatic tires has become particularly important. That is, there has been an ever increasing use of steel cord to provide greater strength and reinforcement in vehicular tires.

The traditional method for bonding rubber to steel is to plate the steel surface with brass for direct contact to rubber. However, besides being expensive, brass plating suffers from the disadvantages of being unusually sensitive to processing conditions and the rubber composition. As a consequence, alternative methods have been sought with particular attention being given to the use of various organic resin adhesives for application to the steel surface prior to pressing into contact with the rubber component. It has since been found that the well known RFL type organic adhesives which have been used for many years in the bonding of polymeric fibers to rubber provide a satisfactory alternative to the conventional brass plating method.

The basic RFL adhesive composition was first described in U.S. Pat. No. 2,128,229 which issued in 1938 and consists of an aqueous emulsion of a resorcinol-formaldehyde resin and a rubber latex. Although there have been various improvements and additions to this basic formulation over the years, such as are described in U.S. Pat. Nos. 3,817,778 and 3,835,082, these additions and improvements have not fundamentally altered the character of the basic composition and all such variants are generally referred to as RFL type organic adhesives.

Although the use of RFL adhesives as the bonding agent in the fabrication of steel and rubber composites has produced generally satisfactory results, a drawback has recently been observed which is manifested when articles comprised of such composites are subjected to moisture-containing environments during use. That is, it has been found that the bond between the adhesive and the steel surface becomes weakened in the presence of water. When exposure to moisture is prolonged, the steel reinforcing element tends to separate from the adhesive binding it to the rubber and the separated surface becomes exposed to the corrosive effects of the aqueous environment. Eventually, the deterioration caused by this separation and corrosion results in failure of the composite product, for example, a pneumatic tire reinforced with steel cord.

Accordingly, it is a principal object of this invention to substantially improve the hydrolytic stability of the adhesive bond between an RFL type organic adhesive and the surface of steel reinforcing elements employed in composites of rubber and steel.

It is a further object of this invention to improve the adhesive bond between steel and rubber in both wet and dry environments when an RFL type organic adhesive is used as the bonding agent.

SUMMARY OF THE INVENTION

The aforementioned objects and purposes of the invention as described and claimed herein are accomplished by a method which broadly stated includes the following steps in sequence:

a. immersing a steel or alloy steel reinforcing element in an acid or base containing aqueous bath for a period of from 3 to 25 seconds with the bath being maintained at a temperature in the range of from 20° C. to 95° C.;

b. subjecting said element to a water rinse;

c. coating the surface of the steel element with an organosilane compound of the following formula:

$$X - R^1 - Si - (OR^2)_3$$

where X is an amino, glycidoxy or an aminoethyl radical; and wherein $R^1$ is an alkylene radical of from 2 to 4 carbon atoms when X is amino or glycidoxy and —HN—$R^3$—, where $R^3$ is an alkylene radical of from 2 to 3 carbon atoms when X is aminoethyl; and wherein $R^2$ is an alkyl of from 1 to 2 carbon atoms;

d. dipping said element in an RFL type organic adhesive dip; and thereafter e. curing said dipped element.

In some instances it has been found desirable to employ both an acid containing bath and a base containing bath in the initial step of preparing the steel surface for application of the organosilane coating. In such case, the steel element is first introduced into a caustic solution and thereafter rinsed with water followed by immersion in an acid solution and a second water rinse.

DETAILED DESCRIPTION OF THE INVENTION

An important aspect of the method in accordance with this invention is the initial preparation of the steel or steel alloy surface for receiving the organosilane primer coating. The purpose of this procedure is to both remove foreign matter, such as grease, oil and other contaminants and to provide the proper electrostatic surface potential to the steel reinforcing element for optimizing the silane to steel bond strength.

The surface preparation may be accomplished by immersing the steel stock in an acid containing aqueous bath maintained at a temperature of from 20° C. to 95° C. with the dwell time in the bath being from about 3 to 25 seconds. Upon emerging from the bath treatment the steel or steel alloy is rinsed thoroughly with water to remove residual bath chemicals and other contaminants. Although an acid containing bath is generally preferred, an aqueous solution of caustic may likewise be employed as an alternative under the same conditions of temperature and dwell time. In some instances, for example, when processing a drawn or rolled steel reinforcing element having a ribbon configuration, the combination of both a caustic and acid bath treatment can be used to advantage. In such case, immersion in each bath is followed by a water rinse.

Any inorganic acid may be employed in making up the aqueous acid bath such as, for example, sulfuric, nitric, hydrochloric, or phosphoric, with phosphoric acid being especially preferred. In the case of the caustic bath a strong base is generally used such as, for example, sodium hydroxide, potassium hydroxide, calcium hydroxide or others. In order to provide the desired ion concentration the starting acid solution preferably has a pH in the range of from about 1 to 2.5, and when employing a solution of caustic the pH is desirably in the range of from about 9 to 10.5. However, it has been found that the procedure is not sensitive to pH changes during operation and wide shifts from the initial pH range do not in general have an adverse effect on the results. In addition to either an acid or base solution, materials such as surfactants, sequestering agents, chelating agents, and other agents may be advantageously added to the bath during make-up.

Although a wide variety of silane coupling agents have been used in the past for improving the bond between dissimilar substances such as for example, between an organic fiber and a synthetic resin, many of these compounds have been found to be totally unsatisfactory for the appllication contemplated by this invention. That is, many difficulties are encountered when attempts are made to bond the surface of a steel reinforcing element, which is probably a complex hydrated iron oxide or hydroxide structure, with an organic RFL adhesive system. It has now been found that this can be accomplished with extraordinarily good results when the organosilane compound employed is of the following formula:

$$X - R^1 - Si - (OR^2)_3$$

where X is an amino, glycidoxy or an aminoethyl radical; and wherein $R^1$ is an alkylene radical of from 2 to 4 carbon atoms when X is amino or glycidoxy and —H-N—$R^3$—, where $R^3$ is an alkylene radical of from 2 to 3 carbon atoms, when X is aminoethyl; and wherein $R^2$ is an alkyl of from 1 to 2 carbon atoms.

Exemplary of such compounds which may be used are gamma-aminopropyltriethoxysilane, gamma-glycidoxypropyltrimethoxysilane, N-beta-aminoethyl gamma-aminopropyltrimethoxysilane, gamma-aminopropyltrimethoxysilane, gamma-aminoethyltriethoxysilane, gamma-glycidoxyethyltriethoxysilane, N-beta-aminoethyl gamma-aminoethyltriethoxysilane, gamma-aminobutyltriethoxysilane and gamma-aminoethyltrimethoxysilane. Preferred compounds are gamma-aminopropyltriethoxysilane, N-beta-aminoethyl gamma-aminopropyltrimethoxysilane and gamma-glycidoxypropyltrimethoxysilane with gamma-aminopropyltriethoxysilane being especially preferred.

Since the aforementioned compounds are soluble in water, they may be conveniently applied from an aqueous solution for coating the steel reinforcing element. The concentration of silane in the aqueous solution should be at least 1.0 percent by volume and can range up to 20 volume percent or higher. However, since it is merely necessary that a monomolecular layer of silane be deposited on the surface of the reinforcing element, this is generally readily accomplished with aqueous solutions which contain a concentration of 1.0 percent by volume of silane and rarely if ever is it necessary that the concentration exceed 5.0 volume percent. Since the silane performance is independent of the mode of application, the coating may be applied at room temperature by any convenient method, for example, by spraying, dipping or brushing. Rigorous drying procedures following application such as the use of forced air or radiant heating are not generally required since it is only necessary to remove excess water from the steel substrate prior to application of the adhesive. This usually can be accomplished by drying in air at room temperature for short period of time.

The RFL type adhesive is applied to the silane treated steel substrate by the standard and conventionally used dip method. That is, the steel reinforcing element is passed through an aqueous system containing the RFL adhesive to deposit a coating of the adhesive on the steel surface. The steel element is then heated to cure the applied adhesive coating. The curing step will generally be in the order of from 1 to 5 minutes at temperatures in the range of from 212° F. to 500° F. At this point, the adhesive coated steel reinforcing element may be embedded in a curable rubber composition to form a partially bonded article. Full bond strength is not, of course, achieved until the curable rubber encasing the steel is cured.

The invention is further illustrated by the following examples:

EXAMPLE 1

A 1 × 5 × 10-mill bright steel tire cord was surface treated in an aqueous bath containing a strongly alkaline commercial cleaning composition sold by the Apex Alkali Products Company under the trademark Apex 764-M. The aqueous bath contained 50 grams per liter of this alkaline composition which provided a pH in the range of about 9.5–10.5. The steel cord was immersed in the caustic bath which was maintained at a temperature of 85° C. for a period of about 15 seconds. This was followed by an air wipe with pressurized air and a rinse with water at 65° C. for 15 seconds.

Since this example was used as a control in various test procedures, an organosilane primer was not applied and the RFL adhesive was deposited directly onto the caustic treated surface of the steel cord. The RFL type adhesive employed was a phenol-resorcinol-formaldehyde-latex as described in U.S. Pat. No. 3,817,778 and was applied by the conventional dip technique followed by heat curing at standard cure temperatures.

EXAMPLE 2

A 1 × 5 × 10-mil bright steel tire cord was surface treated in a caustic bath and water rinsed under conditions and in a manner identical to that described in Example 1, above.

Following this surface preparation a primer was applied to the surface of the steel cord which consisted of the compound gamma-aminopropyltriethoxysilane having the formula $H_2NCH_2CH_2CH_2Si(OC_2H_5)_3$. This was accomplished by dipping the steel cord in an aqueous solution containing 5 percent by volume of the organosilane compound. Following deposition, the silane coating was dried and an RFL adhesive coating was then applied to the surface of the steel cord. The adhesive composition was identical to that employed in Example 1 as was the manner in which it was applied and cured.

EXAMPLE 3

A 1 × 5 × 10-mil bright steel tire cord was processed in a manner identical to that which has been described in Example 2 except that the silane primer applied to the surface of the steel cord before applying the adhesive consisted of the compound gamma-glycidoxypropyltrimethoxysilane having the formula

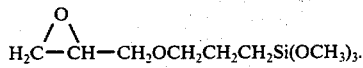

This compound was applied from an aqueous solution whose pH was adjusted to 4.0 with acetic acid.

EXAMPLE 4

A 1 × 5 × 10-mil bright steel tire cord was processed in the same manner as that of Example 2 with the exception that the silane primer applied to the surface of the steel cord prior to application of the adhesive consisted of the compound N-beta-aminoethyl gamma-aminopropyltrimethoxysilane having the formula $H_2NCH_2CH_2 HNCH_2CH_2CH_2Si(OCH_3)_3$.

EXAMPLE 5

This example illustrates the use of an acidic bath for preparing the steel surface to receive the organosilane coating as contrasted with the use of a caustic bath in the previous examples.

A 1 × 5 × 10-mil bright steel tire cord was surface treated in an aqueous bath into which was incorporated a phosphoric acid containing commercial cleaning compositions sold under the trademark Oakite 33 and manufactured by the Oakite Products Company. The bath contained 10 percent by volume of this cleaning composition and had a pH in the range of between about 1.0 to 2.5. The treatment was effected by immersing the steel cord in the acidic bath being at a temperature of 75° C. This was followed by a hot water rinse, with the water being at a temperature of 65° C.

Following the rinse and the removal of excess water from the steel cord, a coating of aminopropyltriethoxysilane was applied to the cord surface. This was done by dipping in an aqueous solution which contained 5 percent by volume of the silane compound. After being applied to the coating was dried and an RFL adhesive was then deposited over the silane coating on the steel cord. The adhesive composition was the same as that employed in Example 1 as was the manner in which it was appllied and cured.

EXAMPLE 6

This example illustrates an embodiment of the invention wherein both a caustic and an acid bath are used in preparing the steel cord surface for receiving the silane primer.

A 1 × 5 × 10-mil bright steel tire cord was immersed in an aqueous bath containing 50 grams per liter of an alkaline commercial cleaning composition whose components included trisodium phosphate, sodium hydroxide and various surfactants and sequestering agents. The bath which was maintained at a temperature of 85° C. has a pH in the range of about 9.5 to 10.5. After a 15 second dwell time in the caustic bath, contaminants were air blown from the steel cord with an air jet at a pressure of 40 psig. This was followed by a 15 second exposure to a hot water rinse at a temperature of 65° C.

The steel cord was then immersed for 5 seconds in a second bath containing an aqueous solution of phosphoric acid with the bath temperature being at 85° C. The aqueous bath contained 2 percent by weight of phosphoric acid and the acidity was adjusted to a pH of 3 with sodium hydroxide. Following treatment in the acid bath, the steel cord was rinsed for 15 seconds in a hot water tank with the water being at a temperature of 65° C.

Following this surface preparation, a primer coating of gamma-aminopropyltriethoxysilane was applied to the steel reinforcing element from an aqueous solution which contained 5 percent by volume of the organosilane compound. The steel surface was then coated with an RFL adhesive. The adhesive composition was the same as that employed in Example 1 and was applied by the conventional dipping procedure. Standard heat cycles were employed to effect a cure of the adhesive coating.

EXAMPLE 7

A 10 mil × 40 mil heat treated steel reinforcing element having a ribbon configuration was immersed for 12 seconds in an aqueous bath containing phosphoric acid in an amount of 2 percent by weight at room temperature. Following treatment in the acid bath, the steel ribbon was rinsed for 12 seconds in a water bath maintained at a temperature of 70° C.

A primer coating of gamma-aminopropyltriethoxysilane was applied to the acid treated ribbon surface from an aqueous solution which contained 2.5 percent by volume of the compound and dried. The ribbon was then coated with an RFL adhesive of the type which was employed in Example 1. After application the adhesive was cured at standard curing temperatures.

The dry adhesive strength between rubber and steel reinforcing elements treated in accordance with this invention was measured by the standard "H-pull" test. In preparing the test sample, a single cord in laminated into two spaced strips of rubber to form the letter H. The H-pull test measures the force required to pull the single cord, in the direction of its axis, from the strip of cured rubber in which the ends of the cord over a given length are embedded. The property measured is a shearing force acting at the cord-to-rubber interface. The values obtained are shown in Table I

TABLE I

| Sample | Force, lbs. |
| --- | --- |
| Example 1 (control) | 51 |
| Example 2 | 51 |
| Example 3 | 64 |
| Example 4 | 56 |
| Example 5 | 64 |
| Example 6 | 64 |
| Example 7 | 40 |

A further procedure for measuring dry static adhesion known as the strip adhesion or peel test was run on various test specimens. The strip adhesion test measures the force required to separate two collimated layers of steel cord cemented together by an intermediate layer of cured rubber. In addition, the appearance of the separated halves of the strip is noted and rated subjectively by visual determination of the amount of cord visible after separating the layers. A scale of 1 to 5 is used in making the ratings. When the steel cord is completely exposed after separating the layers the rating is 1.0; when 75 percent is exposed the rating is 2.0; 50 percent exposure rates 3.0; a 25 percent exposure gives a rating of 4.0; and when the rubber coverage is complete and no cords are showing the rating is 5.0. The results obtained are tabulated in the following table.

TABLE II

| Sample | Separation Force, lbs. | Visual Rating |
| --- | --- | --- |
| Example 1 (control) | 53 | 4.3 |
| Example 2 | 54 | 4.4 |
| Example 3 | 57 | 4.2 |
| Example 4 | 51 | 4.1 |
| Example 5 | 44 | 4.6 |
| Example 6 | 47 | 4.0 |
| Example 7 | 59 | 4.8 |

As Tables I and II show, the test samples in which the steel element was treated in accordance with the present invention exhibit a steel to rubber dry adhesion which is comparable and in some instances superior to that of the control wherein the silane treatment was omitted.

Since a principal object of the method of this invention is to improve the adhesion of steel to rubber in the presence of moisture, determinations were made on the effectiveness of the method for improving bond strength in aqueous environments. A procedure known as the "wet aging strip adhesion" test was employed in making these determinations. Samples for the test are made by first preparing a rubber pad having two collimated layers of steel cord cemented together by an intermediate layer of cured rubber. The pads are 6 × 9 with the cords running along the 6 inch dimension. The pads are produced from a preheated mold using a cure schedule of 30 minutes at 307° F. Approximately ¼ inch wide strips are sheared off the 9 inch edge of the pads to expose the ends of the cords. Each pad is then cut into 12 strips ¾ inch wide. These strips which are labeled for identification are then ready for testing.

In conducting the procedure, the test strips are submerged in tap water and held at a temperature of 75° C. for a predetermined length of time. The water bath is fitted with a constant level feed to make up for evaporation loss and the bath is cleaned and filled with fresh water at the start of each new set of tests. After aging (i.e., immersion in the bath over the test period), the strips are removed from the water and dried. The strips are then pulled at room temperature and the force required to separate the two collimated layers of steel cord cemented together by an intermediate layer of cured rubber is recorded. As in the dry strip adhesion test, the appearance of the separated halves of the strip is rated subjectively by visual determination of the amount of cord visible after separating the layers. Again a rating scale of from 1 (complete exposure of cord) to 5 (no cord exposure) is used as described above for the dry strip adhesion test. The results obtained wherein each of the test samples were exposed to the water bath for a period of 480 hours are given in the following table.

TABLE III

| Sample | Separation Force, lbs. | Visual Rating |
| --- | --- | --- |
| Example 1 (control) | 18 | 2.2 |
| Example 2 | 21 | 5.0 |
| Example 3 | 24 | 3.2 |
| Example 4 | 22 | 4.7 |
| Example 5 | 26 | 5.0 |
| Example 6 | 26 | 4.8 |
| Example 7 | 24 | 5.0 |
| Exposure time in water bath at 75° C. for all test samples: 480 hours | | |

In order to test the hydrolytic stability of the bonds between steel, the adhesive and rubber in an actual pneumatic tire, a procedure called the cut-wet track was run. The test involves constructing passenger car radial tires having the steel reinforcing elements to be tested incorporated therein. After the tires are constructed, they are marked with dividing lines to form four parts or quadrants. Cuts are then made into three of the four quadrants. That is, two cuts are made in one quadrant, four in another and twelve in a third with the fourth quadrant remaining intact. The cuts are of a depth sufficient to expose the outer belt and have diameters of about 3/16 of an inch. The thus prepared tires are then mounted on a standard passenger car which is driven over track surfaces in test cycles which include an 80 foot × 1500 foot wet oval at 12 mph, a 5 mile track at 70 mph with passes through a 1500 foot wet pad at 50 mph and a 5 mile track at 70 mph omitting the wet pad. The test continued until the tires fail with the mileage being recorded at failure for each tire and the mode of failure noted.

TABLE IV

| | Failure Mileage | Failure Mode |
| --- | --- | --- |
| Four tires containing steel reinforcing elements treated in the manner of Example 1 | 8,000 | Whiskering |
| | 11,000 | " |
| | 14,000 | " |
| | 15,000 | " |
| Four tires containing steel reinforcing elements treated in the manner of Example 2 | 26,000 | Blow out/whiskering |
| | 26,000 | Belt separation/wire walking |
| | 30,000 | Belt separation/wire walking |
| | 35,000 | No failure - test terminated (evidence of wire walking) |

As is seen from the results reported in the above table, tires fabricated with steel reinforcing cords which had been treated in accordance with the method of this invention (Example 2) more than doubled the performance of tires of the control (Example 1), i.e., tires containing steel cords which were not surface treated with the organosilane compounds of this invention.

Although the invention has been described with respect to details of the preferred embodiments many modifications and variations thereof which clearly fall within the scope of the invention as defined by the following claims will be apparent to those skilled in the art.

We claim:

1. A method for improving the hydrolytic stability of the adhesive bond between an RFL organic adhesive and a steel reinforcing element for rubber articles, said method comprising the following steps in sequence:
   a. immersing a steel or alloy steel reinforcing element in an aqueous bath which contains an inorganic acid having a pH in the range of from about 1 to 2.5 at make-up or a strong base having a pH in the range of from about 9 to 10.5 at make-up for a period of from 3 to 25 seconds with the bath being maintained at a temperature in the range of from 20° C. to 95° C.;
   b. subjecting said element to a water rinse;
   c. coating the surface of the steel element with an organosilane compound of the formula $$X - R^1 - Si - (OR^2)_3$$

where X is an amino, glycidoxy or an aminoethyl radical; and wherein $R^1$ is an alkylene radical of from 2 to 4 carbon atoms when X is amino or glycidoxy and —H-

N—R³—, where R³ is an alkylene radical of from 2 to 3 carbon atoms when X is aminoethyl; and wherein R² is an alkyl of from 1 to 2 carbon atoms;

d. dipping said element in an RFL organic adhesive; and
  e. curing said dipped element.

2. The method of claim 1, wherein said organosilane compound is selected from the group consisting of gamma-aminopropyltriethoxysilane, gamma-glycidoxypropyltrimethoxysilane, and N-beta-aminoethyl gamma-aminopropyltrimethoxysilane.

3. A steel or alloy steel reinforcing element for rubber products which has been treated in accordance with the method of claim 1.

4. A pneumatic tire containing steel or alloy steel reinforcing elements which have been treated in accordance with the method of claim 1.

5. A steel or alloy steel reinforcing element having a ribbon configuration which has been treated in accordance with the method of claim 1.

6. A pneumatic tire containing steel or alloy steel reinforcing elements having a ribbon configuration which have been treated in accordance with the method of claim 1.

7. A method for improving the hydrolytic stability of the adhesive bond between an RFL organic adhesive and a steel or alloy steel reinforcing element for rubber products, said method comprising the following steps in sequence:

a. immersing a steel or alloy steel reinforcing element in an aqueous bath which contains a strong base having a pH ranging from about 9 to 10.5 at make-up for a period of from 3 to 25 seconds with the bath being maintained at a temperature in the range of from 20° C. to 95° C.;
  b. rinsing the steel or steel alloy element with water;
  c. introducing said element into an aqueous bath containing an inorganic acid having a pH ranging from about 1 to 2.5 at make-up for a period of from 3 to 25 seconds with the bath being maintained at a temperature in the range of from 20° C. to 95° C.;
  d. subjecting said element to a second water rinse;
  e. coating the surface of the steel or alloy steel element with an organosilane compound of the formula:

$$X - R^1 - Si(OR^2)_3$$

where X is an amino, glycidoxy or an aminoethyl radical; and wherein R¹ is an alkylene radical of from 2 to 4 carbon atoms when X is amino or glycidoxy and —HN—R³—, where R³ is an alkylene radical of from 2 to 3 carbon atoms when X is aminoethyl; and wherein R² is an alkyl of from 1 to 2 carbon atoms;

f. dipping said element in an RFL organic adhesive; and
  g. curing said dipped element.

8. A steel or alloy steel reinforcing element having a ribbon configuration which has been treated in accordance with the method of claim 7.

9. A pneumatic tire containing steel or alloy steel reinforcing elements having a ribbon configuration which have been treated in accordance with the method of claim 7.

* * * * *